US007184566B2

United States Patent
Tamura et al.

(12) United States Patent
(10) Patent No.: US 7,184,566 B2
(45) Date of Patent: Feb. 27, 2007

(54) BASS REFLEX TYPE SPEAKER DEVICE, MOUNTING STRUCTURE AND MOUNTING METHOD FOR SPEAKER DEVICE

(75) Inventors: Ichiro Tamura, Utsunomiya (JP); Tadashi Murayama, Utsunomiya (JP); Kazuhiro Katayama, Yaita (JP); Shuhki Ohtani, Tochigi (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 10/507,629

(22) PCT Filed: Mar. 4, 2003

(86) PCT No.: PCT/JP03/02526

§ 371 (c)(1),
(2), (4) Date: Sep. 14, 2004

(87) PCT Pub. No.: WO03/079719

PCT Pub. Date: Sep. 25, 2003

(65) Prior Publication Data
US 2005/0117768 A1   Jun. 2, 2005

(30) Foreign Application Priority Data
Mar. 15, 2002 (JP) .............................. 2002-071349
Nov. 20, 2002 (JP) .............................. 2002-336509

(51) Int. Cl.
*H04R 25/00* (2006.01)

(52) U.S. Cl. ...................... 381/388; 381/306; 381/333

(58) Field of Classification Search ................ 381/306, 381/333, 361, 365, 386, 388; 181/148, 160, 181/198–199
See application file for complete search history.

(56) References Cited

U.S. PATENT DOCUMENTS

| 5,111,905 A |   | 5/1992 | Rodgers |
| 5,147,986 A |   | 9/1992 | Cockrum et al. |
| 5,361,380 A | * | 11/1994 | You et al. ................... 381/333 |
| 5,400,408 A | * | 3/1995 | Lundgren et al. .......... 381/333 |
| 5,844,176 A |   | 12/1998 | Clark |

FOREIGN PATENT DOCUMENTS

JP   182429/1986 A   6/1988

(Continued)

*Primary Examiner*—Suhan Ni
(74) *Attorney, Agent, or Firm*—Birch, Stewart, Kolasch & Birch, LLP (57) ABSTRACT

A bass reflex type speaker apparatus comprises a speaker box having an opening portion on a front surface, a speaker unit (1) mounted within the speaker box in conformity with the opening portion, and a tubular duct (7) that externally radiates sound from a rear surface of the speaker unit (1) disposed within the speaker box through phase inversion. The duct (7) has on the same plane one or a plurality of bent portions bent in substantially dogleg form and linear portions extending at both ends of the bent portion, the duct being disposed in parallel with the front surface of the speaker box. At least the longest linear portion of the linear portions is disposed tilted relative to wall surfaces except for the front and rear surfaces of the speaker box. It is thus possible to reduce the size, namely height, width and depth, of the speaker box incorporating the duct.

8 Claims, 9 Drawing Sheets

FOREIGN PATENT DOCUMENTS

| | | |
|---|---|---|
| JP | 64-889 A | 1/1989 |
| JP | 39520/1988 A | 10/1989 |
| JP | 95302/1989 A | 4/1991 |
| JP | 4-114598 A | 4/1992 |
| JP | 6-217385 A | 8/1994 |
| JP | 7-177443 A | 7/1995 |
| JP | 8-336194 A | 12/1996 |
| JP | 9-65251 A | 3/1997 |
| JP | 2000-324584 A | 11/2000 |
| JP | 2001-145186 A | 5/2001 |

\* cited by examiner

BASS REFLEX TYPE SPEAKER DEVICE, MOUNTING STRUCTURE AND MOUNTING METHOD FOR SPEAKER DEVICE

FIELD OF THE INVENTION

The present invention relates generally to a bass reflex type speaker apparatus and a mounting structure and method of the speaker apparatus, and more particularly, to a compact and lightweight bass reflex type speaker apparatus and a structure and method for mounting the speaker apparatus to a thin television receiver, etc.

BACKGROUND OF THE INVENTION

While bass playback in a speaker system is dependent on the cabinet, there are various types of cabinets each reproducing distinctive sound based on the size, shape and system of the acoustic device required. In one of the cabinets that take into consideration sound playback, a bass reflex type speaker is used that actively employs sound wave from the rear surface of the speaker. To enhance bass playback capability, the bass reflex type speaker, also referred to as phase inverted type, is designed to upgrade the bass characteristic radiated from the speaker's vibrating surface to its entire surface by providing openings and a duct in a baffle plate provided with the speaker, by inverting the phase of sound coming out from the rear surface of the speaker diaphragm and by radiating the sound externally from the openings via the duct. By using such a phase inverted type cabinet, it is possible to flatly reproduce sound down to a lower level of bass than the speaker unit is capable of reproducing.

Figure 1:
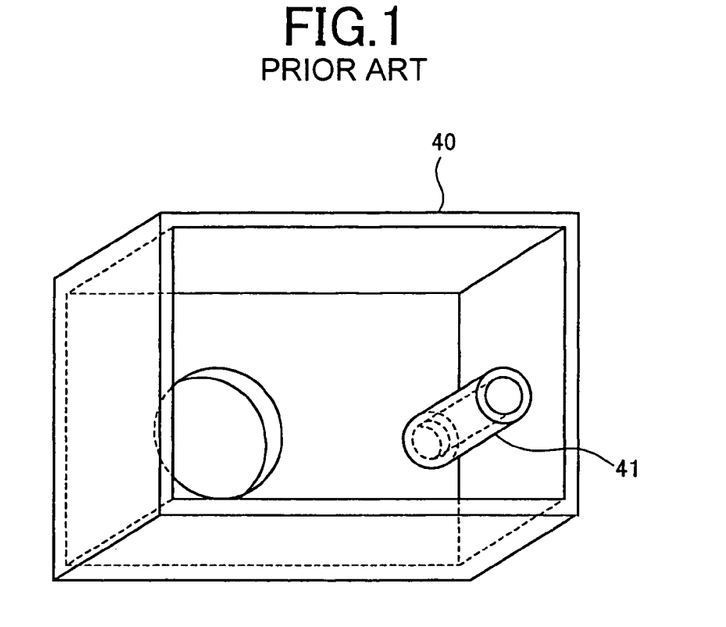
FIG. 1 is a perspective view showing a configuration example of a conventional speaker apparatus.

FIG. 1 is a perspective view showing a configuration example of a conventional speaker apparatus, with 40 representing the speaker apparatus and the speaker apparatus having a duct 41. As the aforementioned bass reflex type speaker apparatus, an apparatus is disclosed as shown in FIG. 1 that is designed to upgrade the bass characteristic by extracting, in general, radiation from the duct to the listener's side, that is, to the speaker's opening surface side and using the bass reflex effect thereof (see, e.g., Patent Documents 1 and 2).

As disclosed in the embodiment of Patent Document 1, there exists another apparatus that adjusts the bass characteristic by projecting a substantially U-shaped duct on the rear surface of the box, fastening the duct diagonally along the rear surface wall of the box and reinforcing the wall member.

Further, as a conventional example of providing a speaker integral with a woofer box within the main body of a CRT television set, there is proposed an apparatus that releases sound by extending a woofer box output port externally and downward of the box and releases sound toward the front surface after causing sound wave to be reflected by the external bottom surface (see, e.g., Patent Document 3).

The aforementioned prior arts all relate to apparatuses that are either a speaker box used alone or a speaker designed to upgrade bass by using a space deep to a certain extent such as CRT television.

With a growing number of display devices available recently using thin displays such as liquid crystal, PDP (Plasma Display) and EL televisions, there are demands for mounting a woofer speaker—either speaker integrated type or deep to the same extent as the depth of the display device—within the main bodies of these thin display devices and reproducing attractive bass. As a speaker for use in such thin display devices, speaker cabinet is required to be compact and lightweight to the extent possible and thin in shape. However, if it is desired to reproduce powerful bass while retaining the distinctive bass effect as bass reflex type speaker, the cabinet is required to be of a fixed volume or more. In particular, the depth from a speaker opening portion to a rear surface cabinet should be a fixed size or more.

As a solution to the aforementioned problem, while it is possible to form a speaker portion, for example, by using the entire rear surface of the flat display as widely as possible, the problem of widening of required two-dimensional area remains unsolved. Further, as described earlier, the bass reflex effect is often used by extracting the external opening (port) provided at one end of the duct on the same surface as the speaker opening surface or on the rear surface in many conventional bass reflex type speaker boxes. In an example of extending the opening at one end of the duct downward into the speaker box, the purpose of the opening is to suck inner air, and these speaker boxes are used in an environment where the inner space thereof can be widely used to a certain extent.

Recent years have seen demands for mounting, within the main body of a thin display device as thick as about 10 to 20 cm such as liquid crystal television, a woofer speaker— either speaker integrated type or deep to the same extent as the depth of the display device's main body as described above, thus stressing the bass effect. In this case, if sound playback is attempted by arranging a woofer at the center and mid/treble stereo speakers on the left and right near there in the thin display device, with the woofer close to the stereo speakers on the right and left, sound component in the mid/treble range other than bass range leaks out from the center woofer, deteriorating the stereo feeling. When a woofer speaker is used in such an arrangement, it is possible to enjoy sufficient bass without necessarily releasing the bass reflex duct on the same side as the opening side of the speaker unit.

When a speaker unit-integrated dome-shaped speaker such as the aforementioned speaker is mounted in a conventional thin television receiver, the speaker unit is fixed, using mounting holes (generally two to four holes) provided on the outer perimeter thereof and with screws or others, to the mounting bosses provided on the front or back cabinet side of the television receiver or to mounting portions on the front cabinet's main body, in order to prevent jitter of the television screen due to vibrations of the speaker's main body.

As a conventional speaker box mounting structure, means are disclosed for pressing and fixing a speaker unit with fitting ribs provided on the dome's main body and the back cabinet of the television receiver (see, e.g., Patent Document 4).

As means for fixing a speaker box within a television receiver, means are disclosed for mounting a pair of left and right speaker boxes to the front cabinet of a television receiver (see, e.g., Patent Document 5).

Incidentally, if an attempt is made to reproduce powerful bass by mounting a woofer speaker-integrated thin speaker box within the enclosure of a television receiver having a thin display device as described above, sound pressure, radiated to the rear surface side of the speaker box, is high in addition to bass pressure radiated to the speaker unit's opening portion (front surface side) of the speaker box during woofer speaker playback, unlike mid/treble playback. Therefore, if the woofer speaker box is fixed only to the front cabinet side of the television receiver's main body using a plurality of mounting portions provided on the outer perimeter of the woofer speaker box, vibrations of the speaker box conduct only to the front cabinet side of the television receiver's main body through the plurality of mounting portions, thus resulting in jitter of the screen itself or vibrations of the receiver's entire enclosure.

If, in order to dissipate the vibrations through distributed conduction by integrally using the front and back cabinets of the television receiver's main body, all the plurality of mounting holes provided on the outer perimeter of the woofer speaker box are pressed, tightened together and fixed using both the front and back cabinets of the receiver's main body, vibrations of the speaker box's main body resulting from woofer sound pressure conduct between both cabinets through all of the plurality of mounting and fixing portions in a plurality of paths, affecting not only the display unit of the television receiver's main body but also other portions as a whole and resulting in jitter of the screen itself and vibrations of the receiver's entire enclosure as described earlier.

In particular, if a woofer box is incorporated in the enclosure of a television receiver using a thin display device, because the enclosure is vertically or horizontally thin, and combined with other restrictions such as incapability of taking large space along the depth of the enclosure, the space for sound pressure radiated from the rear surface of the woofer speaker unit, in particular, is narrow, making the screen and the receiver's main body more prone to jitter and vibration than conventional CRT type television receiver and making it impossible to increase the woofer output beyond a fixed level.

In light of the above, it is an object of the present invention to provide a speaker apparatus that can be integrated with the main body of a thin display device and that can be made more compact and thinner to about the same extent as the depth of the thin display device's main body. It is another object of the present invention to provide, when playback is performed with a woofer speaker and mid/treble stereo speakers arranged side by side on the same surface of a thin display device, a bass reflex type speaker apparatus that allows sensitivity improvement in bass range by sufficiently attenuating mid/treble sound component radiated from the woofer speaker.

It is still another object of the present invention to provide a speaker apparatus mounting structure and method capable of reproducing a sufficient level of bass and effectively suppressing vibrations of the display unit and vibrations of the entire enclosure even if the apparatus is mounted and fixed within the enclosure of a thin display device.

Patent Document 1: Japanese Laid-Open Patent Publication No. H06-217385
Patent Document 2: Japanese Laid-Open Patent Publication No. H04-114598
Patent Document 3: Japanese Laid-Open Patent Publication No. 2001-145186
Patent Document 4: Japanese Laid-Open Patent Publication No. H09-65251
Patent Document 5: Japanese Laid-Open Patent Publication No. H08-336194

SUMMARY OF THE INVENTION

A bass reflex type speaker apparatus according to the present invention is characterized in that it comprises a speaker box having an opening portion on a front surface, a speaker unit mounted within the speaker box in conformity with the opening portion, and a tubular duct that externally radiates sound from a rear surface of the speaker unit disposed within the speaker box through phase inversion, wherein the duct has on the same plane one or a plurality of bent portions bent in substantially dogleg form and linear portions extending at both ends of the bent portion, and wherein the duct is disposed in parallel with the front surface of the speaker box. The speaker apparatus is further characterized in that at least the longest linear portion of the linear portions is disposed tilted relative to one or more wall surfaces except for the front and rear surfaces of the speaker box. It is thus possible, by bending a bass reflex duct, by diagonally fixing and mounting the duct relative to a given wall surface of a speaker box and by arranging the longest longitudinal portion of the duct in parallel with the front surface of the speaker box, to reduce the size, namely, height, width and depth of the speaker box incorporating the duct.

The speaker apparatus is further characterized in that the speaker box has a second opening portion for externally projecting one of the linear portions extended from the bent portion of the duct, and that the bent portion is disposed in the vicinity of the second opening portion of the speaker box. The speaker apparatus is further characterized in that the duct is disposed at a position where the duct does not overlap the speaker unit as seen two-dimensionally from the front surface of the speaker box. The speaker apparatus is further characterized in that the length of the linear portion projected externally from the second opening portion outside the speaker box is shorter than that of the other linear portion extended internally from the bent portion into the speaker box. It is thus possible, because the bent portion of the bass reflex duct is arranged near the speaker unit and because the bass reflex duct is displaced two-dimensionally from the direction of thickness of the speaker unit, to reduce the size, namely, height, width and depth of the speaker box incorporating the duct.

The speaker apparatus is further characterized in that an inner surface at a front end of the linear portion of the duct projected externally from the second opening portion is spread in tapered form near the second opening portion of the speaker box. The speaker apparatus is further characterized in that the opening surface of the duct projected from the second opening portion is oval. It is thus possible, because the external opening of the bass reflex duct is spread in tapered form toward the front end side, to gradually weaken the sound pressure at the blow-off portion, thus improving wind noise, a sound that readily occurs at the external opening of the duct. It is also possible, because the external opening surface is oval, to reduce the depth of the speaker box, thus allowing thickness reduction.

The speaker apparatus is further characterized in that the speaker box has the second opening portion on a wall surface other than the front and rear surfaces of the speaker box. It is thus possible, because the radiation direction of the external opening surface of the bass reflex duct is oriented in a direction different from that of the opening surface of the speaker unit and because, for example, in the usage environment where a woofer and left and right stereo speakers must be installed close to each other and on the same plane, mid/treble-band sound component leaking out from the woofer can be released vertically in a different direction, to simplify a mid/treble-band elimination filter used in a woofer drive circuit, thus allowing reducing cost and keeping the stereo feeling intact.

A speaker apparatus mounting structure for mounting and fixing a speaker apparatus with a substantially box-shaped speaker box within an enclosure of a television receiver having front and back panels is characterized in that the speaker apparatus is provided with a plurality of first mounting portions for clamping and retaining vibration-insulating members at any plurality of corner portions of all the corner portions of the speaker box and with a second mounting portion that projects upward at a substantially center position on an upper portion of a top surface of the speaker box, the second mounting portion clamping and retaining at least one vibration-insulating member, the first and second mounting portions being disposed integrally with the speaker box, and that the vibration-insulating members of the first mounting portions are secured to mounting members provided on the front panel of the television receiver, the vibration-insulating member of the second mounting portion being clamped between the front and back panels by clamping members on the front and back panels of the television receiver such that the clamped vibration-insulating member and the clamping members are tightened together and fixed. The speaker apparatus mounting structure is further characterized in that the speaker box is made up of front and back cabinets, and that the first and second mounting portions are disposed in parallel and on substantially the same plane when viewed from a cross-section joining the front and back cabinets of the speaker box. The speaker apparatus mounting structure is further characterized in that the first and second mounting portions are depression-shaped so as to be open upward when viewed from the front or back cabinet. The speaker apparatus mounting structure is further characterized in that the vibration-insulating members are cylindrical elastic bodies. It is thus possible, because, in a configuration where a speaker box is mounted within the enclosure of a thin television receiver, the speaker box is pressed and fixed to a front panel making up the enclosure's front surface portion of the television receiver with a plurality of mounting portions provided on the outer perimeter of the front cabinet of the speaker box and because the both of front and back panels of the television receiver are tightened together and fixed at one point with a single mounting portion provided on the uppermost portion on the outer perimeter of the front cabinet of the speaker box, to suppress conduction of vibrations from the incorporated speaker to the entire enclosure of the display device, thus reducing screen jitter and vibrations of the receiver's main body.

The speaker apparatus mounting structure is further characterized in that the vibration-insulating member of the second mounting portion is clamped by bosses provided on the front and back panels of the television receiver, each boss projecting inward, and that, by fixing the clamped vibration-insulating member and the bosses with fixing members, the speaker apparatus is mounted such that at least one point of the speaker apparatus is suspended by the front and back panels of the television receiver. The speaker apparatus mounting structure is further characterized in that the speaker apparatus is a bass reflex type speaker apparatus incorporating at least one speaker unit, that the speaker apparatus has a tubular duct for externally radiating sound from a rear surface of the speaker unit through phase inversion, and that a sound release surface of the duct is disposed on a wall surface other than the front and rear surfaces of the speaker box. It is thus possible, because a single mounting portion, provided on a top surface portion on the outer perimeter of the front cabinet of the speaker box, is fixed only to the back panel of the television receiver and because the back panel suspends the speaker box from above at one point with the single mounting portion, to ensure that it is difficult for the effect of sound pressure, radiated from the opening portion on the front surface of the speaker unit and the back surface thereof, to conduct in the direction of depth of the enclosure of the television receiver during bass playback, thus allowing suppressing conduction of vibrations from the incorporated speaker to the entire enclosure of the display device.

A speaker apparatus mounting method for mounting and fixing a speaker apparatus with a substantially box-shaped speaker box within an enclosure of a television receiver having front and back panels is characterized in that it comprises clamping and retaining vibration-insulating members by first mounting portions disposed at any plurality of corner portions of all the corner portions of the speaker box; clamping and retaining at least one vibration-insulating member by a second mounting portion projecting upward at a substantially center position on an upper portion of a top surface of the speaker box; securing the vibration-insulating members of the first mounting portions to mounting members provided on the front panel of the television receiver; and clamping the vibration-insulating member of the second mounting portion between the front and back panels by clamping members on the front and back panels of the television receiver such that the clamped vibration-insulating member and the clamping members are tightened together and fixed.

PREFERRED EMBODIMENT OF THE INVENTION

An embodiment of the present invention will now be described in detail with reference to FIGS. 2 to 9.

Figure 2:
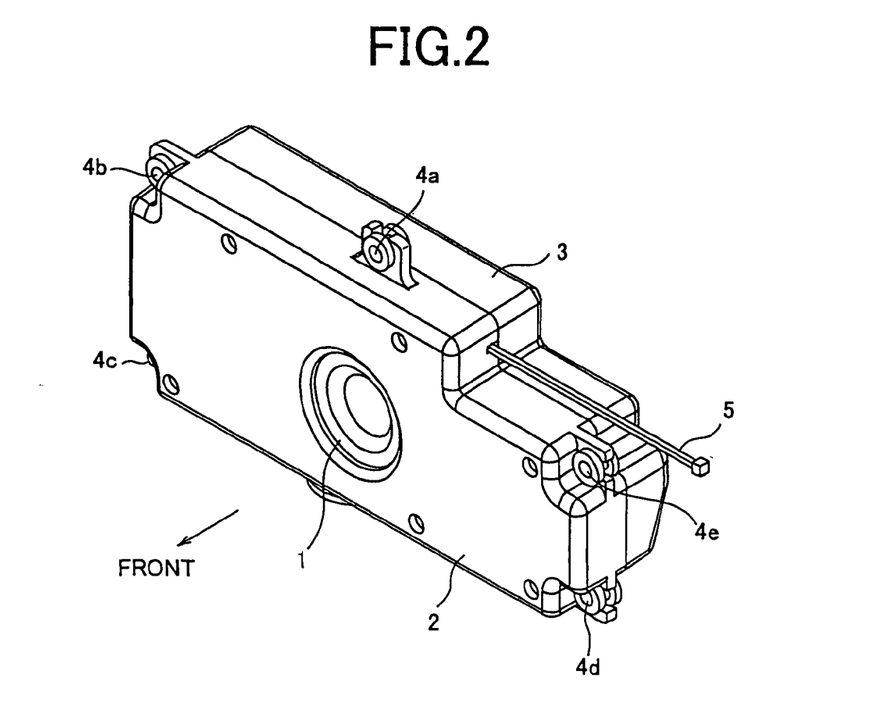
FIG. 2 is a perspective view, as seen from the speaker opening side, of a bass reflex type speaker apparatus according to the present invention.

FIG. 2 is a perspective view, as seen from the speaker opening side, of a bass reflex type speaker apparatus according to the present invention, showing the outline of a rectangular box speaker, an embodiment of the present invention. The speaker box of the present bass reflex type speaker apparatus is configured by integrating a woofer speaker unit 1 with front and back cabinets 2 and 3 having an opening, with both cabinets fixed to a front panel of a television receiver, etc. with mounting holes (4b to 4e) provided at four surrounding positions. Therefore, the back cabinet 3 serves also as a rear surface wall of the speaker box. It is to be noted that there is inserted into a mounting hole 4a, a boss for fixing front and back panels of the television receiver. On the other hand, 5 in FIG. 2 is a speaker connection connector.

Figure 3:
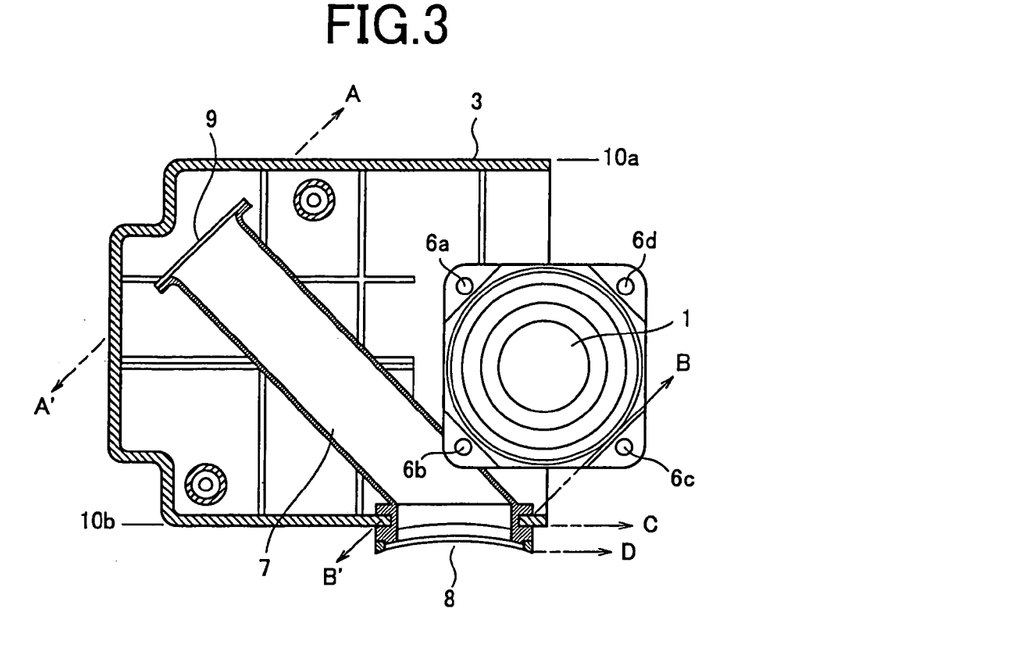
FIG. 3 is a sectional view showing the left-half configuration, as seen from front, of the bass reflex type speaker apparatus according to the present invention.
Figure 4:
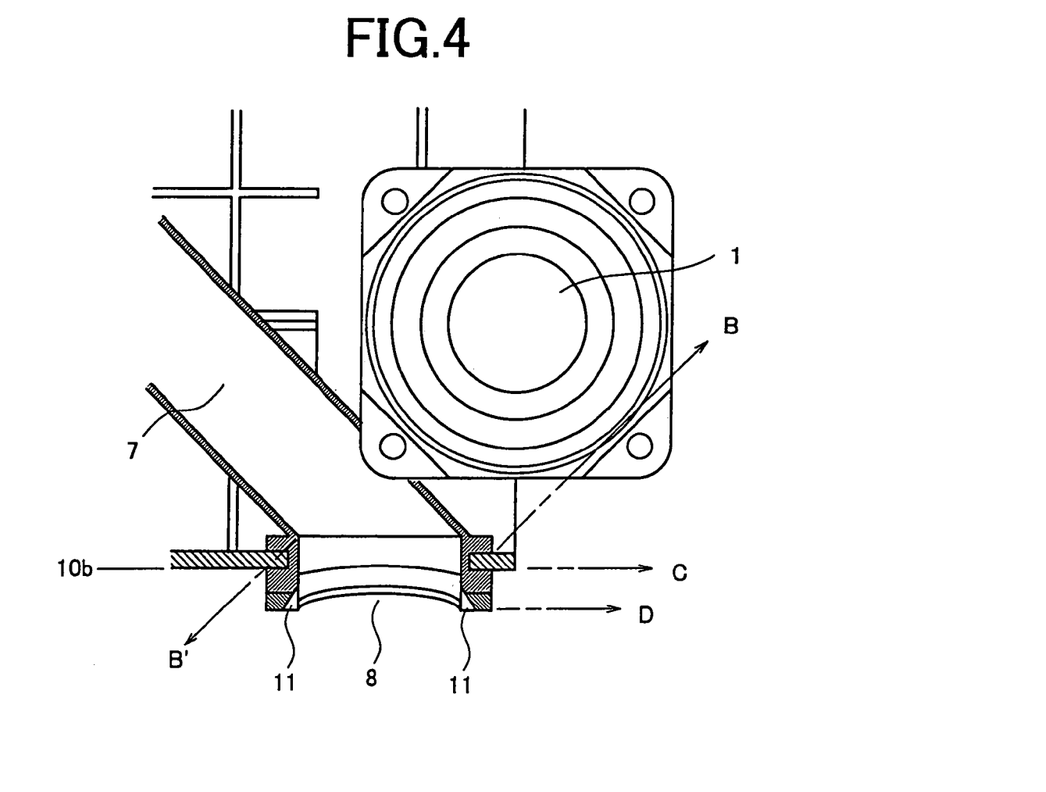
FIG. 4 is a partial enlarged view of an external opening portion that is an end portion of a duct of the bass reflex type speaker apparatus according to the present invention.

FIG. 3 is a sectional view showing the left-half configuration, as seen from front, of the bass reflex type speaker apparatus according to the present invention, showing the left-half configuration of the speaker apparatus with the front cabinet 2 of the present speaker apparatus removed. FIG. 4 is a partial enlarged view of an external opening portion that is an end portion of a duct of the bass reflex type speaker apparatus.

The duct structure will be described based on FIGS. 3 and 4. In FIG. 3, 6a to 6d are mounting holes of the speaker unit 1, 7 a bass reflex duct, 8 an external opening portion of the bass reflex duct 7, 9 an inner opening portion of the bass reflex duct 7, 10a a top surface portion of the back cabinet 3 and 10b a bottom surface portion of the back cabinet 3.

In FIG. 3, the speaker unit 1 is mounted and fixed, near the substantial center of the back cabinet 3, to the side surface wall of the front cabinet 2, not shown, with the mounting holes (6a to 6d) provided at four surrounding positions on a member in the form of a flat plate. In the present embodiment, a cylindrical duct is used as the bass reflex duct 7, and the bass reflex duct 7 can be fixed very close to the speaker unit 1.

The bass reflex duct 7 bends in substantially dogleg form near the external opening portion 8 to release sound as shown in the figure, being fastened, with fastening means, to the front cabinet 2 that is tilted at a given angle relative to a bottom surface 10b of the back cabinet 3.

Here, while having two openings at both ends as shown in FIG. 3, the duct structure of the present embodiment is made up of two paths; a longer portion from a front end portion A–A' of the inner opening portion 9 to a bent portion B–B' and a shorter portion from the portion B–B' to a point D of a front end portion of the external opening portion 8 releasing sound. Of these, the position of the inner opening portion 9, one end of the longer portion, is extended to near a corner portion of the speaker box, thus securing the duct's linear distance required for bass reflex effect.

Figure 5:
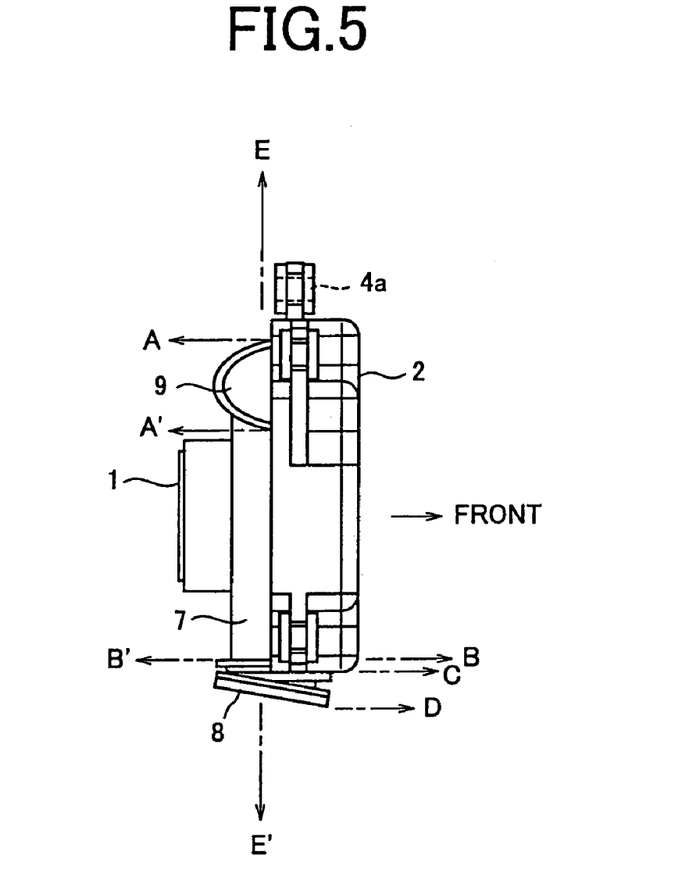
FIG. 5 is a partial sectional view showing, in a right-side view of the bass reflex type speaker apparatus according to the present invention, the speaker apparatus with a back cabinet removed.

FIG. 5 is a partial sectional view showing, in a right-side view of the bass reflex type speaker apparatus according to the present invention, the speaker apparatus with a back cabinet 3 removed. As shown in FIG. 5, to make the speaker box thinner, the apparatus is disposed such that the direction shown by line E–E' in the same figure, i.e., an entire longitudinal linear portion of the bass reflex duct 7 is parallel with the front surface of the speaker box, i.e., the opening surface of the speaker unit 1.

According to the present invention, it is possible, by bending the bass reflex duct, by diagonally fixing and mounting the duct relative to a given wall surface of the speaker box and by arranging the longest longitudinal portion of the duct in parallel with the front surface of the speaker box (i.e., opening surface of the speaker unit), to reduce the size, namely, height, width and depth of the speaker box incorporating the duct.

Further, as shown in the plan view of FIG. 3, it is possible to reduce the thickness of the speaker box similarly as described earlier because the bass reflex duct 7 is arranged at a position where it does not overlap the speaker unit 1 two-dimensionally in the direction of thickness, as seen from the opening surface side of the speaker unit 1.

Next, while, as shown in FIG. 3, the duct projects, with its length extended from the position of the portion B–B' of the bass reflex duct 7 to the point D, vertically downward of the bottom surface 10b of the back cabinet 3, the position of the bent portion B–B' of the bass reflex duct 7 is provided near the external opening portion 8.

That is, in the present configuration, while considering the inner volume of the speaker box, the linear distance is lengthened to the extent possible from the front end portion A–A' of the inner opening portion 9, a portion having a considerable impact on the resonance frequency characteristic of bass required for the bass reflex duct 7 to function as a resonance tube, to the position of the bent portion B–B', and further the remaining length is added with the length from the bent portion B–B' to the point D. For this reason, it is possible to address any change by changing the length of a projecting portion (from the bent portion B–B' to the point D) of the bass reflex duct 7 in conformity with the inner volume of the speaker box required for bass reflex effect.

According to the present invention, it is possible, because the bass reflex duct is arranged near the speaker unit and displaced two-dimensionally from the direction of thickness of the speaker unit, to reduce the size, namely, height, width and depth of the speaker box incorporating the duct.

It is possible, because the bent portion of the bass reflex duct is positioned close to the position where the external opening portion of the duct is extracted from the speaker box, to change, for example, the bass acoustic characteristic by adjusting the length of the projecting portion of the external opening portion 8 alone without changing the size of the speaker box.

The bass reflex duct 7 is tilted relative to the bottom surface 10b of the back cabinet 3 (or the front cabinet 2 not shown) as shown in FIG. 3. With this regard, as shown in FIGS. 3 and 5, of the length from A–A' to the point D—the total length of the bass reflex duct 7, the length from A–A' to the point of the bent portion B–B', i.e., the longest longitudinal portion of the entire longitudinal length (length from A–A' to the point D) of the bass reflex duct 7 is, as shown in the side view of FIG. 5, arranged diagonally at a given angle relative to at least the wall surfaces of the speaker box (equivalent to the top and bottom surfaces and the left and right wall surfaces in the case of the box-shaped speaker box shown in FIG. 3) other than the opening surface (front surface) and rear surface of the speaker unit 1.

Thus, by tilting the bass reflex duct 7 in a given direction, it is possible to reduce, in response to demands for more compact thin speaker box, the height and width in particular, of the speaker box to the extent possible.

It is to be noted that while there is provided only one bent portion of the bass reflex duct 7 in the present embodiment, the speaker box can be made more compact by having a duct provided with a plurality of bent portions.

Next, in the present embodiment, the inner surface of the opening portion, projecting from the speaker box, of the bass reflex duct 7 between C and D is spread in tapered form, as shown in the partially enlarged view of the external opening portion 8 in FIG. 4. That is, an inner surface portion 11 of the external opening portion 8, from the point C to the opening front end point D in the same figure, is gradually spread toward the front end, thus gradually enlarging the cross-sectional area.

This has the effect, when the front end portion (point D in the figure) of the external opening portion 8 is allowed to project at an angle vertical to the radiation direction, of improving wind noise that occurs more readily due to large variations in air pressure as a result of abrupt radiation of high sound pressure during bass playback at the exit. By spreading the inner surface portion 11 of the external opening portion 8 in tapered form, sound pressure at the point C of the external opening portion 8 gradually weakens as sound pressure progresses toward the point D at the front end, thus allowing considerably improving wind noise.

According to the present invention, it is possible, because the inner surface of the external opening portion of the bass reflex duct is spread in tapered form toward the front end side, to gradually weaken the sound pressure at the blow-off portion, thus improving wind noise.

Figure 6:
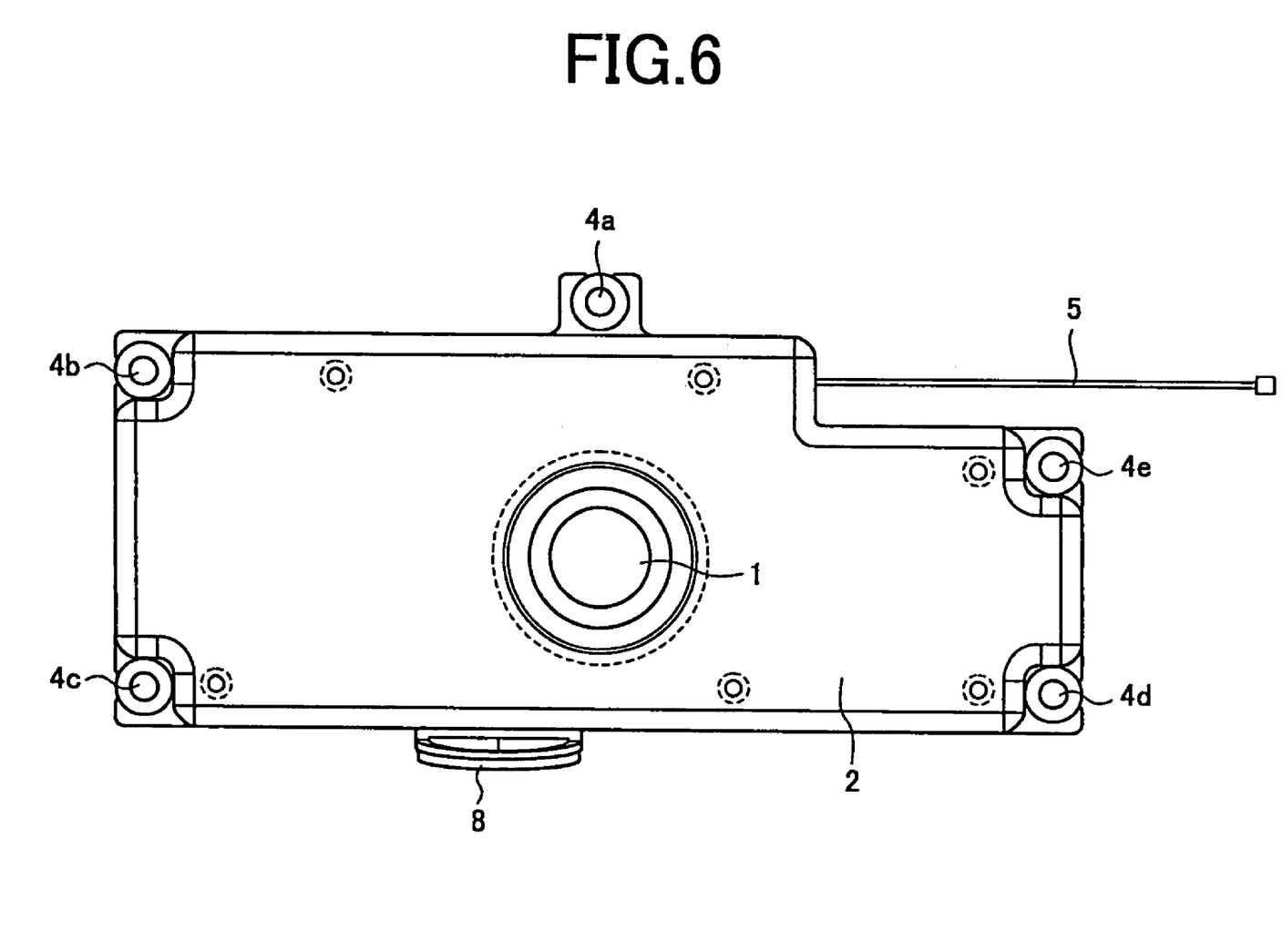
FIG. 6 is a front view, as seen from the opening surface side of a speaker unit, of the bass reflex type speaker apparatus according to the present invention.
Figure 7:
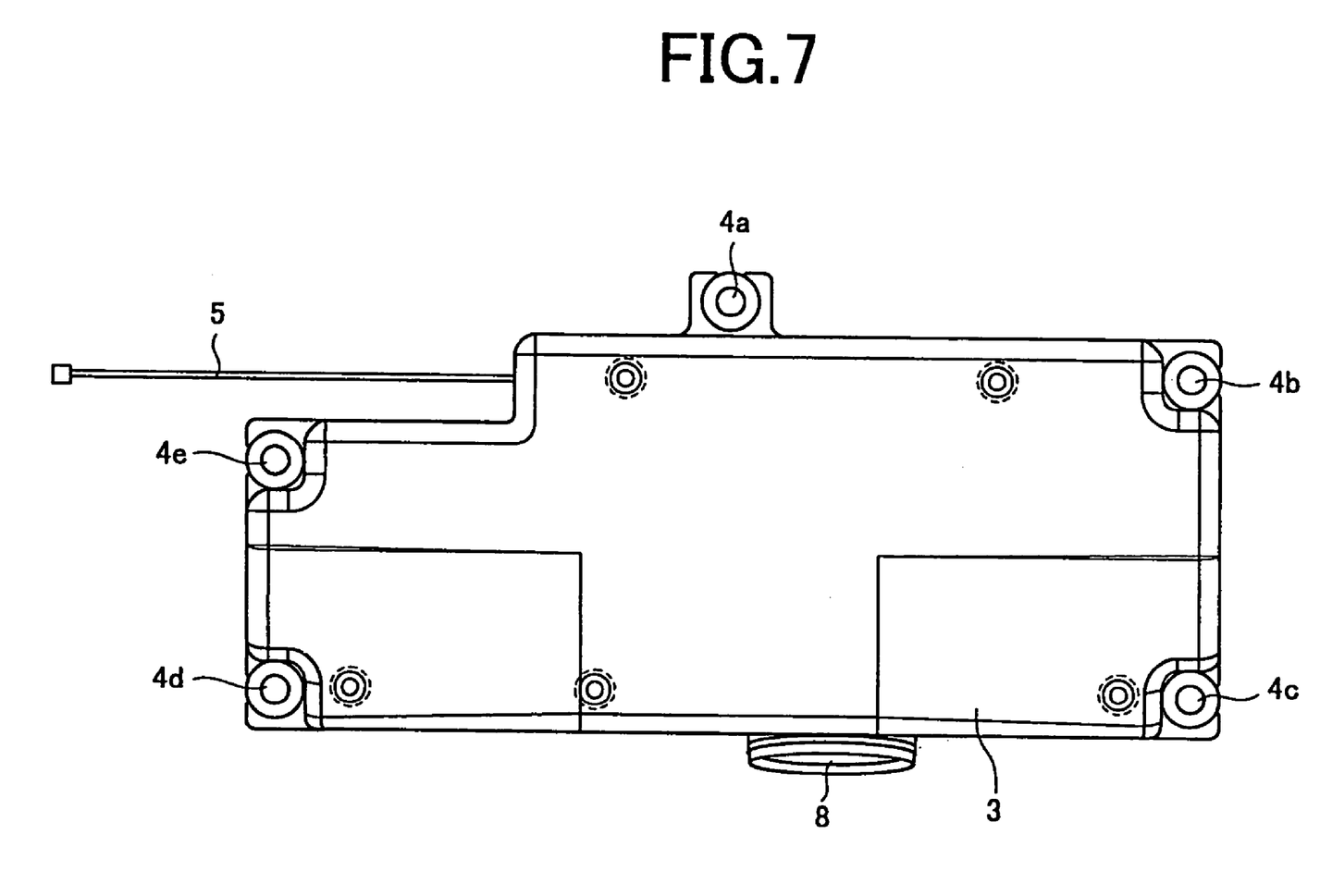
FIG. 7 is a rear view, as seen from the back cabinet, of the bass reflex type speaker apparatus according to the present invention.
Figure 8:
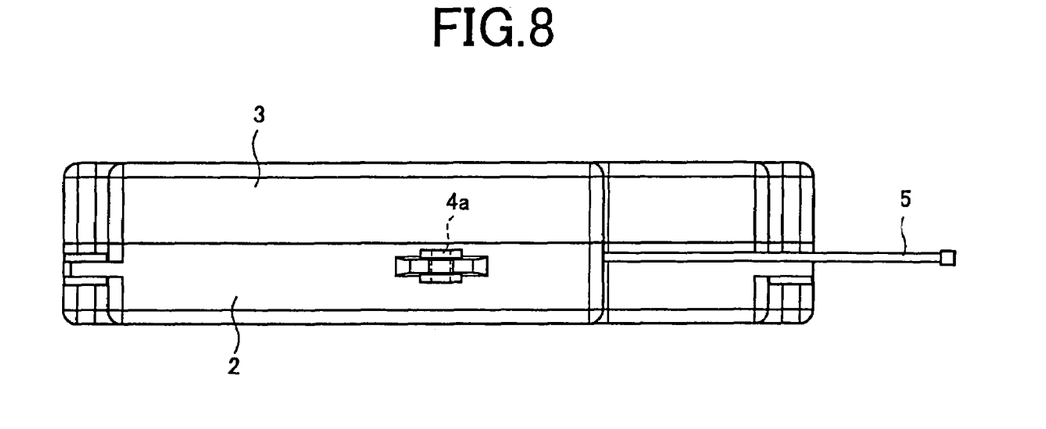
FIG. 8 is a top view, as seen from top, of the bass reflex type speaker apparatus according to the present invention.
Figure 9:
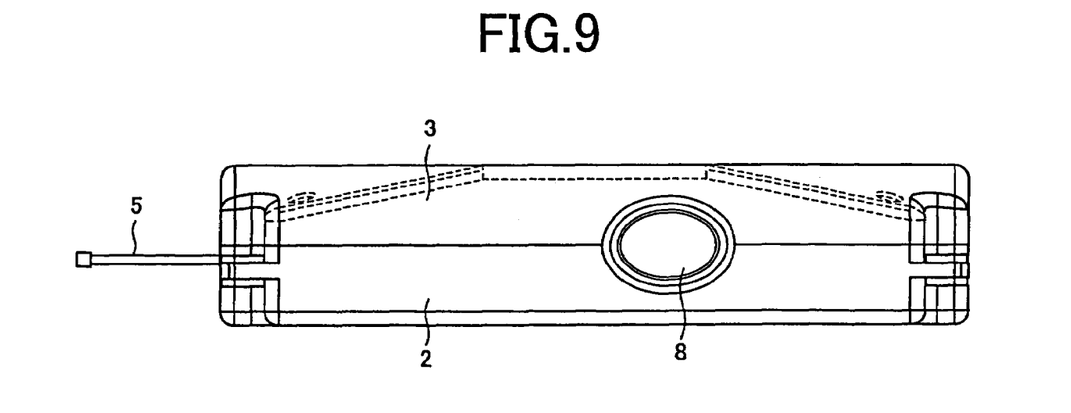
FIG. 9 is a bottom view, as seen from bottom, of the bass reflex type speaker apparatus according to the present invention.

FIG. 6 is a front view, as seen from the opening surface side of the speaker unit 1, of the bass reflex type speaker apparatus according to the present invention. FIG. 7 is a rear view, as seen from the back cabinet 3, of the bass reflex type speaker apparatus according to the present invention. FIG. 8 is a top view, as seen from top, of the bass reflex type speaker apparatus according to the present invention. FIG. 9 is a bottom view, as seen from bottom, of the bass reflex type speaker apparatus according to the present invention.

Here, as shown in the bottom view of FIG. 9, the external opening portion 8 of the duct 7 is provided on the bottom surface of the speaker box in the present embodiment, with the cross-section being oval as shown in the same figure. It is to be noted that the range of the oval cross-sectional portion in the present embodiment is the tapered portion in the duct's inner surface portion between C and D shown in FIG. 3.

According to the present invention, it is possible, because the bass reflex duct has an oval external opening surface, to reduce the depth of the speaker box, thus allowing thickness reduction.

While in the embodiment described above, the duct located within the speaker box is cylindrical, the above embodiment is not limited to cylindrical duct, and the same effect can be obtained by using an oval or box-shaped duct.

The direction, in which the external opening portion 8 of the bass reflex duct 7 is provided, can be changed arbitrarily depending on the positions where mid/treble stereo speakers are installed that are used together with the woofer of the display device used, and may be radiated toward the wall surface of the speaker box other than the front and rear surfaces thereof such as the top surface side or the left and right wall surfaces of the speaker box.

According to the present invention, the radiation direction of the external opening portion of the bass reflex duct is different from that of the opening surface of the speaker unit. This makes it possible to release mid/treble-band sound component leaking out from the woofer, for example, in a usage environment where the woofer and left and right stereo speakers must be installed close to each other and on the same plane, vertically in a different direction, reducing the cost of a mid/treble-band elimination filter used in a woofer drive circuit and keeping the stereo feeling intact.

One embodiment of the speaker apparatus mounting structure and method according to the present invention will be described below based on FIGS. 10 to 13.

Figure 10:
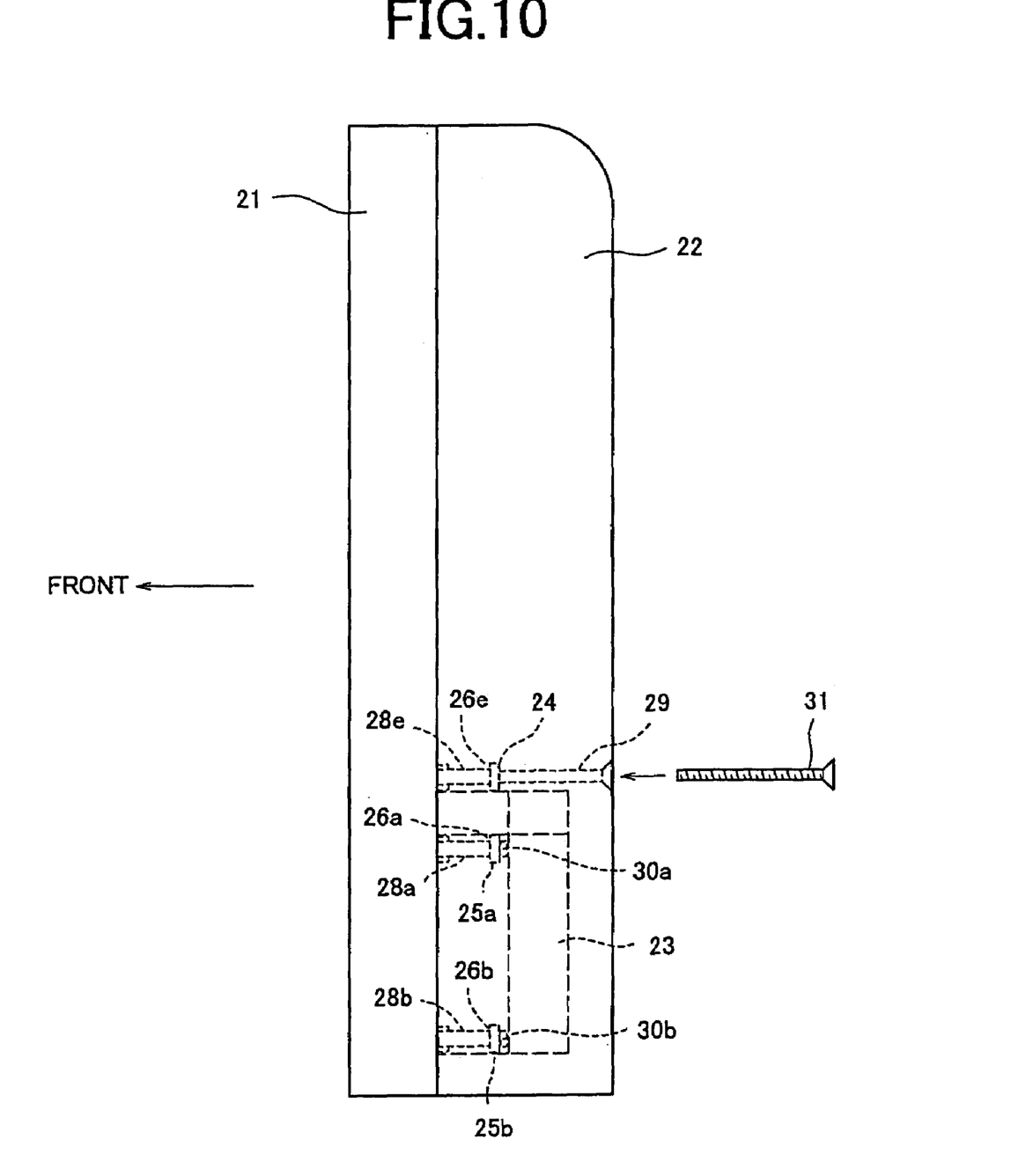
FIG. 10 is a side view of a thin television receiver according to the present invention with a speaker box mounted therein.
Figure 11:
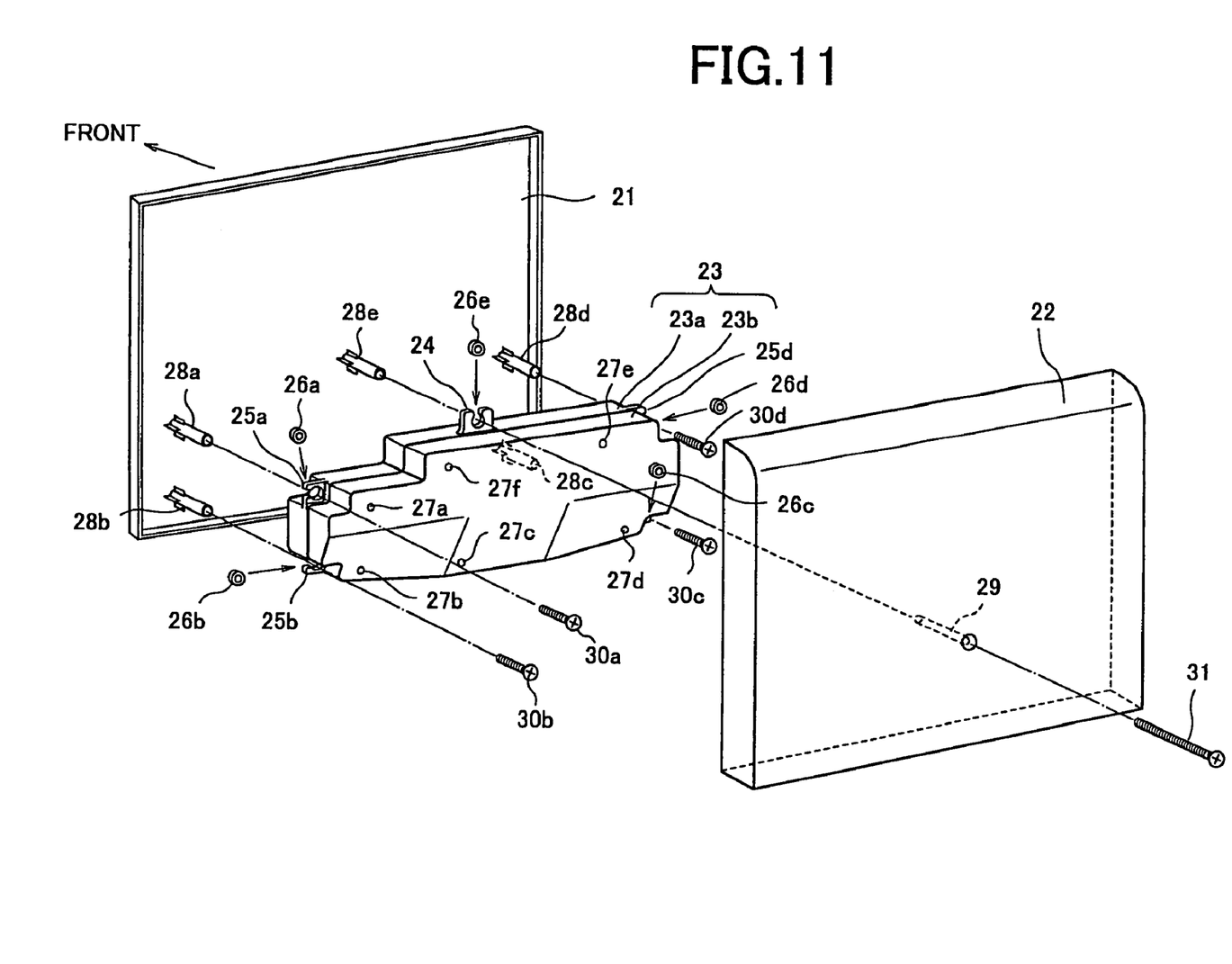
FIG. 11 is a partial perspective view, as seen from rear, when the speaker box is mounted in the thin television receiver according to the present invention.
Figure 12:
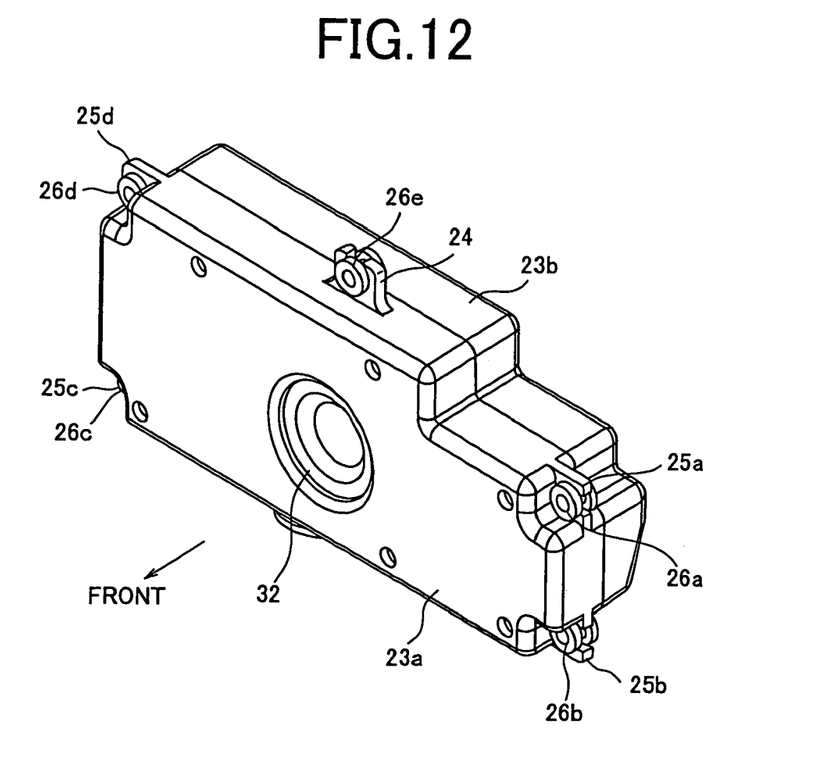
FIG. 12 is a perspective view, as seen from front, of the speaker box applied to the present invention.
Figure 13:
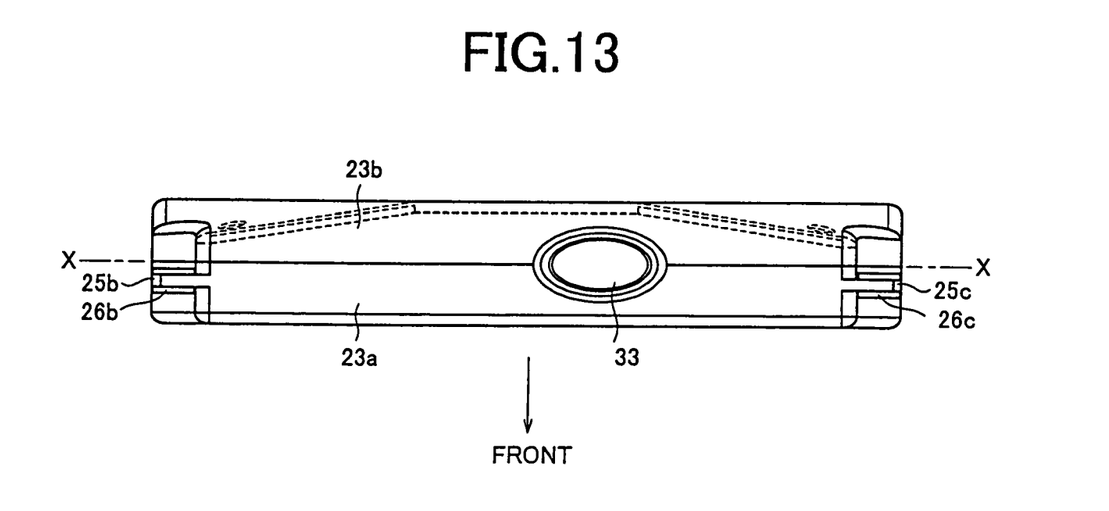
FIG. 13 is a bottom view, as seen from bottom, of the speaker box applied to the present invention.

FIG. 10 is a side view of a thin television receiver according to the present invention, with a speaker box mounted therein. FIG. 11 is a partial perspective view, as seen from rear, when the speaker box is mounted in the thin television receiver according to the present invention. FIG. 12 is a perspective view, as seen from front, of the speaker box applied to the present invention. FIG. 13 is a bottom view, as seen from bottom, of the speaker box applied to the present invention.

While in the present embodiment, a case will be described in which a woofer speaker box is mounted and fixed at a lower portion of the enclosure of a television receiver using liquid crystal panel as a thin display device, other panel such as PDP or EL panel may be used as applicable thin display device.

In FIGS. 10 to 13, 21 is a liquid crystal television receiver's front panel, 22 a back panel of the television receiver and 23 a speaker box, with the speaker box 23 having a front cabinet 23a and a back cabinet 23b. Further, the speaker box 23 has mounting portions 24, 25a, 25b, 25c and 25d that are provided projecting on the outer perimeter portion of the front cabinet 23a. On the other hand, 26a, 26b, 26c, 26d and 26e are, for example, vibration-insulating members made of cylindrical rubber members, with these members inserted from the notched portion side of each of the mounting portions 24, 25a, 25b, 25c and 25d and held. Each of 27a, 27b, 27c, 27d, 27e and 27f is a speaker box mounting hole for fixing the front and back cabinets 23a and 23b with screws (not shown). Each of 28a, 28b, 28c, 28d and 28e is a boss configured integrally with the front panel 21 of the television receiver on the rear surface side of the front panel 21 and provided projecting in the inner direction; 29 is a boss provided integrally with the back panel 22 on the rear surface side of the back panel 22 of the television receiver and projecting in the inner direction.

Meanwhile, 30a, 30b, 30c and 30d are each a screw for mounting and fixing the speaker box 23 to each of the bosses (28a, 28b, 28c, 28d) provided on the rear surface portion of the front panel 21 of the television receiver; 31 a screw for tightening together and fixing the back panel 22 of the television receiver to the boss 28e provided on the rear surface portion of the front panel 21 of the television receiver via the mounting portion 24 provided on the upper portion of the speaker box 23. It is to be noted that while more screws than the aforementioned ones are used to fix the front and back panels 21 and 22 of the television receiver, those screws and bosses not related to the problem in the present invention are not shown. In FIGS. 12 and 13, on the other hand, 32 is a speaker unit mounted within the speaker box 23, and 33 a duct provided on the bottom surface portion of the speaker box 23.

First, a description will be given of the outline of the mounting method for mounting the speaker box 23 within the enclosure of a liquid crystal television receiver.

As shown in the side view of FIG. 10, after the speaker box 23 is mounted to the lower portion of the front panel 21, the back panel 22 is fixed to the front panel 21. At this time, the speaker box mounting portion 24, provided on the upper portion of the speaker box 23, is sandwiched between the boss 28e provided on the front panel 21 and the boss 29 provided on the inner side of the back panel 22 so as to face the side of the boss 28e, thus tightening together and pressing and fixing the mounting portion 24 with the mounting screw 31 from the rear surface portion of the back panel 22.

As shown in FIG. 11, there are provided the speaker box mounting bosses (28a to 28e) on the lower portion of the front panel 21 of the television receiver, and the mounting portions 24 and 25a to 25d, provided on the outer perimeter of the substantially rectangular speaker box 23, are mounted, with their longitudinal direction oriented horizontally, to the mounting bosses (28a to 28e).

It is to be noted that as shown in the front perspective view of the speaker box 23 in FIG. 12, the woofer bass reflex type speaker unit 32 is mounted and fixed within the speaker box 23 by fixing members (not shown), with the opening thereof facing the front surface. Here, there is provided on the bottom surface portion of the speaker box shown in FIG. 12, the sound release duct 33 of the bass reflex type speaker as shown in FIG. 13. The duct 33, having an oval sound release port, plays a role of radiating a given frequency component downward of the television receiver's enclosure from the sound release port.

According to the present invention, in a configuration where the speaker box is mounted within an enclosure of a thin television receiver, the speaker box is pressed and fixed with a plurality of mounting portions to the front panel making up the front surface portion of the television receiver's enclosure, and both of the front and back panels of the television receiver are tightened together and fixed at one point with a single mounting portion provided on the top surface portion on the outer perimeter of the front cabinet of the speaker box, suppressing conduction of vibrations from the incorporated speaker to the entire enclosure of the display device and reducing screen jitter and vibrations of the receiver's main body.

The mounting configuration of the bass reflex type speaker box 23 will be described below in sequence.

As shown in FIG. 12, the speaker box 23 is a horizontal box-shaped speaker, and the front and back cabinets 23a and 23b of the speaker box 23 are joined by first adhering the joining portions of the two with a member such as adhesive and then tightening and fixing the mounting holes (27a to 27f) with a plurality of screws (not shown) from the rear surface portion of the back cabinet 23b, as shown in FIG. 11, thus enhancing hermetic properties of the two joining portions.

There are provided, integrally with the front cabinet 23a, on the outer perimeter portion of the front cabinet 23a of the main body of the speaker box 23, the plurality of mounting portions 24 and 25a to 25d for mounting the speaker box 23 to the front panel 21 of the television receiver. As for the positions of these mounting portions, the mounting portion 24 is provided on the upper portion, whereas the mounting portions 25a to 25d are each provided at a corner portion on the left or right side surface.

Of these, the mounting portion 24 is, as shown in FIG. 12, provided projecting upward at the substantially horizontal center portion when viewed from the opening portion (front surface side) of the speaker box 23, with the mounting portion 24 shaped to have the front end portion notched in the shape of a depression and the depression-shaped portion hollowed out in a cylindrical manner in the direction of thickness as shown in FIG. 11.

The mounting portion 24 has the vibration-insulating member 26e, made of a cylindrical elastic member having a hollow at the center (rubber bushing used in the present invention) shown in FIG. 11, inserted from the side surface and held and fixed in the depression-shaped notched portion as shown in FIG. 12.

The mounting portion 24 is provided, as described above, at the center portion on the upper surface of the front cabinet 23a of the speaker box 23. The reason for this is, as described later, to suspend the entire speaker box 23 from above at a single fulcrum in consideration of mounting to the back panel 22 of the television receiver.

As shown in FIGS. 10 and 11, the four mounting portions (25a to 25d), provided on the outer perimeter corner portions of the front cabinet 23a of the speaker box 23, are each shaped such that the front end portion is notched inward in the shape of a depression as well as the mounting portion 24, with the vibration-insulating member (rubber bushing used as 26a, 26b, 26c, 26d in the present embodiment), made of an elastic member of the same shape as the vibration-insulating member 26e, inserted and fixed in the depression-shaped portion of each of the mounting portions.

By providing, in a fixed manner, these vibration-insulating members in each mounting portion, vibrations of the speaker box 23 are suppressed from conducting to the enclosure of the television receiver. While in the present embodiment, rubber was used for the vibration-insulating members, for example, silicon rubber and other materials can be preferably used. The vibration-insulating members are not limited thereto, and other elastic materials such as spring, leaf spring and urethane may be used.

As for the two-dimensional positions of the above-described mounting portions (24, 25a, 25b, 25c, 25d), these portions are provided in parallel with each other and on substantially the same plane, when viewed from the joining cross-section along a line X—X shown in FIG. 13, thus preventing the number of mounting vibration points of the speaker box 23 from increasing in the direction of depth of the speaker box 23 when the speaker box 23 is fixed to the front panel 21 of the television receiver.

As for the joining surface of the front and back cabinets 23a and 23b of the speaker box 23 shown by the line X—X in FIG. 13, the surface is fastened first by applying adhesive, and then the back cabinet 23b is fixed to the front cabinet 23a with screws (not shown) thus enhancing hermetic properties, preventing vibrations and enhancing the acoustic characteristic of the speaker box 23.

The speaker box 23 used in the present invention is a phase inverted type bass reflex speaker box incorporating the woofer speaker unit 32, with the duct that determines the acoustic characteristic thereof provided within the box. However, when a bass reflex speaker box is mounted within the enclosure of a thin television receiver, it is of extreme importance, in order to suppress vibrations of the speaker and the receiver's main body, in which direction of the enclosure of the television receiver the sound release port of the external duct of the speaker box is provided.

While in the present invention, the sound release port of the duct is provided on the bottom surface portion of the speaker box 23, that is, on the external wall surface of the speaker box 23 oriented vertically in a different direction from the opening surface or the rear surface of the speaker unit 32, sound is externally released in the present embodiment from the bottom surface of the television receiver's enclosure as shown in FIG. 13. This makes it possible to release unnecessary mid/treble-band frequency components from the speaker unit 32 downward from the sound release port oriented downward. At this time, it is important that there are no shields near the sound release port such as objects or walls. In the presence of any of such shields, sound wave from the sound release port is reflected, possibly imparting vibrations to the television receiver.

While in the aforementioned embodiment of the present invention, sound from the duct is released, as an example, from the bottom portion side of the enclosure of the television receiver because the speaker box 23 is provided on the lower portion of the enclosure of the television receiver, the duct's sound release port may be provided on the upper surface wall of the speaker box 23, if, for example, the speaker box 23 is provided on the upper portion of the enclosure of the television receiver, and alternatively the duct's sound release port may be provided on the side surface wall of the speaker box 23 if the speaker box 23 is provided on the left or right side surface of the enclosure of the television receiver. That is, the position where the sound release duct is provided on the speaker box 23 can be arbitrarily selected depending on the shape of the television receiver's enclosure and the mounting position of the speaker box.

According to the present invention, the single mounting portion, provided on the top surface portion on the outer perimeter of the front cabinet of the speaker box, is fixed only to the back panel of the television receiver, thus resulting in the back panel suspending the speaker box from above at one point with the single mounting portion. This makes it difficult for the effect of sound pressure, radiated from the opening portion on the front surface of the speaker unit or from the rear surface thereof, to conduct in the direction of depth of the enclosure of the television receiver during bass playback, thus suppressing conduction of vibrations from the incorporated speaker to the entire enclosure of the display device.

When the speaker box is mounted, the back panel of the television receiver's enclosure is fixed only at one point to the front panel of the television receiver's enclosure via the speaker box, thus allowing reduction of the number of bosses, necessary for mounting the speaker box and provided on the enclosure of the television receiver, and labor cost.

Next, the procedure will be described for mounting the speaker box 23 to the enclosure of the television receiver.

In FIG. 11, the vibration-insulating members (26a, 26b, 26c, 26d, 26e), held in the depressed portions provided in the mounting portions 24 and 25a to 25d of the speaker box 23, are inserted onto the bosses (28a to 28e) provided on the front panel 21 of the television receiver. Then, the speaker box 23 is mounted and fixed to the front panel 21 via the mounting portions 25a to 25d and the bosses (28a to 28e) using the screws (30a, 30b, 30c, 30d). In this condition, therefore, only the mounting portion 24 provided on the upper portion of the speaker box 23 is not fixed. Then, the back panel 22 of the television receiver is pressed and fixed to the front panel 21 using a plurality of mounting screws (not shown).

Here, on the lower portion of the back panel 22, there is provided projecting inward toward the back panel 22 at the substantially horizontal center position, the boss 29 for fixing the speaker box 23 and that is hollowed out. The boss 29 of the back panel 22, the mounting portion 24 of the speaker box 23 and the boss 28e of the front panel 21 of the television receiver are pressed and fixed with the mounting screw 31 from the rear surface of the back panel 22 of the television receiver.

In the present invention, as described above, in order to fix the speaker box 23 to the enclosure of the television receiver, each of the mounting portions provided on the outer perimeter of the speaker box 23 are fixed to the front panel 21 of the television receiver via the bosses alone. On the other hand, the single mounting portion 24, provided on the top surface portion of the speaker box 23, tightens together and fixes both the front and back panels 21 and 22 of the television receiver via the bosses, thus fixing the speaker box 23 by suspending the speaker box 23 at one fixed fulcrum using both the front and back cabinets of the television receiver.

INDUSTRIAL APPLICABILITY

As set forth hereinabove, the speaker apparatus according to the present invention, while being not only compact and lightweight but also thin, is applicable to a bass reflex type speaker apparatus having excellent bass characteristic. At the same time, when the bass reflex type speaker apparatus is incorporated in a television receiver equipped with a thin display device such as liquid crystal display device (LCD) or plasma display device (PDP), it is possible to provide a speaker-integrated television receiver capable of suppressing vibrations of the speaker apparatus from conducting to the entire enclosure of the display device thanks to the speaker apparatus mounting structure and method according to the present invention.

What is claimed is:

1. A speaker apparatus mounting structure for mounting and fixing a speaker apparatus with a substantially box-shaped speaker box within an enclosure of a television receiver having front and back panels, wherein the speaker apparatus is provided with a plurality of first mounting portions for clamping and retaining vibration-insulating members at any plurality of corner portions of all the corner portions of the speaker box and with a second mounting portion that projects upward at a substantially center position on an upper portion of a top surface of the speaker box, the second mounting portion clamping and retaining at least one vibration-insulating member, the first and second mounting portions being disposed integrally with the speaker box, and wherein the vibration-insulating members of the first mounting portions are secured to mounting members provided on the front panel of the television receiver, the vibration-insulating member of the second mounting portion being clamped between the front and back panels by clamping members on the front and back panels of the television receiver such that the clamped vibration-insulating member and the clamping members are tightened together and fixed.

2. The speaker apparatus mounting structure as defined in claim 1, wherein the speaker box includes front and back cabinets,
wherein the first and second mounting portions are disposed in parallel and on substantially the same plane when viewed from a cross-section joining the front and back cabinets of the speaker box.

3. The speaker apparatus mounting structure as defined in claim 1, wherein the first and second mounting portions are depression-shaped so as to be open upward when viewed from the front or back cabinet.

4. The speaker apparatus mounting structure as defined in claim 1, wherein the vibration-insulating member of the second mounting portion is clamped by bosses provided on the front and back panels of the television receiver, each boss projecting inward, and wherein, by fixing the clamped vibration-insulating member and each of the bosses with fixing members, the speaker apparatus is mounted such that at least one point of the speaker apparatus is suspended by the front and back panels of the television receiver.

5. The speaker apparatus mounting structure as defined in claim 1, wherein the vibration-insulating members are cylindrical elastic bodies.

6. The speaker apparatus mounting structure as defined in any one of claims 1 to 5, wherein the speaker apparatus is a bass reflex type speaker apparatus incorporating at least one speaker unit.

7. The speaker apparatus mounting structure as defined in claim 6, wherein the speaker apparatus has a tubular duct for externally radiating sound from a rear surface of the speaker unit through phase inversion, and wherein a sound release surface of the duct is disposed on a wall surface other than the front and rear surfaces of the speaker box.

8. A speaker apparatus mounting method for mounting and fixing a speaker apparatus with a substantially box-shaped speaker box within an enclosure of a television receiver having front and back panels, comprising:

clamping and retaining vibration-insulating members by first mounting portions disposed at any plurality of corner portions of all the corner portions of the speaker box;

clamping and retaining at least one vibration-insulating member by a second mounting portion projecting upward at a substantially center position on an upper portion of a top surface of the speaker box; securing the vibration-insulating members of the first mounting portions to mounting members provided on the front panel of the television receiver; and clamping the vibration-insulating member of the second mounting portion between the front and back panels by clamping members on the front and back panels of the television receiver such that the clamped vibration-insulating member and the clamping members are tightened together and fixed.

* * * * *